United States Patent [19]

Czaja

[11] 4,106,294
[45] Aug. 15, 1978

[54] THERMODYNAMIC PROCESS AND LATENT HEAT ENGINE

[76] Inventor: Julius Czaja, 4 Crestview Dr., Pittsford, N.Y. 14534

[21] Appl. No.: 765,045

[22] Filed: Feb. 2, 1977

[51] Int. Cl.² .............................................. F02C 1/04
[52] U.S. Cl. ....................................... 60/649; 60/673; 60/674
[58] Field of Search .......................... 60/649, 673, 674; 261/DIG. 54; 55/89

[56] References Cited

U.S. PATENT DOCUMENTS

| | | | |
|---|---|---|---|
| 2,151,949 | 3/1939 | Turner .................................... | 60/649 |
| 2,852,239 | 9/1958 | Vicard ........................ | 261/DIG. 54 |
| 2,983,332 | 5/1961 | Vicard ........................ | 261/DIG. 54 |
| 3,358,451 | 12/1967 | Feldman et al. ....................... | 60/649 |
| 3,681,009 | 8/1972 | Horsley ............................. | 55/277 X |
| 3,972,195 | 8/1976 | Hays ...................................... | 60/649 |

FOREIGN PATENT DOCUMENTS 2,308,970  9/1974  Fed. Rep. of Germany .............. 60/649

*Primary Examiner*—Allen M. Ostrager
*Attorney, Agent, or Firm*—Stonebraker, Shepard & Stephens

[57] ABSTRACT

The invention involves thermodynamic processes, heat engines, and ways of making gaseous fluid jets by using primarily the latent heat of condensation for the energy required. A vapor such as water vapor is mixed with a gaseous fluid such as air, and the mixture is expanded in a nozzle sufficiently to condense a substantial portion of the vapor and transform the latent heat of the condensation into kinetic energy of the gaseous fluid. The process can be used to form a gaseous fluid jet, which can be used to drive the turbine of a heat engine for either open-cycle or closed-cycle operation. Moist ambient wind can be used as the energy source for producing a jet that drives a wind turbine, or a boiler can be used to form saturated vapor mixed with the gaseous fluid and directed into the nozzle. For closed-cycle systems, the gaseous fluid exhausted from the turbine and the liquid from the condensation of the vapor are both recompressed, the liquid is revaporized, and the vapor and compressed gaseous fluid are recombined. The process is efficient enough so that electric energy from the turbine output can be used to heat a liquid supply for storing energy that is later reconverted to electricity, and operating pressures and temperatures are low enough so that a wide variety of energy sources become usable, including many that are impractical with present heat engines.

27 Claims, 10 Drawing Figures

THERMODYNAMIC PROCESS AND LATENT HEAT ENGINE

BACKGROUND OF THE INVENTION

Heat engines using air, steam, mixtures of air and steam, and other working media have been suggested, and most of these use a single gaseous fluid as a working medium. The steam engine, and especially the steam turbine, has been the most popular and successful heat engine, and present commercial steam engines have maximum efficiencies of less than 40% in converting the energy available from fuel into shaftwork. Steam engines and other workable heat engines have used a heat sink, usually in the form of a condenser, where unavailable heat of condensation is discarded, and vapor cycles such as the Rankine cycle and thermodynamic cycles for other heat engines as explained in many texts all require a heat sink where energy is unavoidably discarded.

The invention arose from thermodynamic comparisons between heat engines and weather phenomena, which produce enormous energy exchanges involving the latent heat of condensation and fusion, and the invention recognizes ways that similar energy transfers involving the latent heat of condensation or fusion can be put to practical use in heat engines and other thermodynamic processes under human control to eliminate the need to discard energy to a heat sink and to greatly increase efficiencies. Natural weather phenomena occur from a mixture of air and water vapor at relatively low temperatures and pressures compared to steam engines, and the invention involves recognition of ways that similar mixtures of air or other gaseous fluids with water vapor or other vapors can produce energy transfers that can be put to practical and efficient uses in heat engines and other devices involving thermodynamic processes. The substantial increase in efficiency and the lower operating temperatures and pressures used in practicing the invention also lead to use of many different heat sources than are presently practical for steam engines, use of liquid energy storage systems, use of heat wasted from other processes, and enormous reductions in the heat energy required for producing shaftwork, electricity, and multitudes of by-products.

SUMMARY OF THE INVENTION

The invention includes a method of forming a gaseous fluid jet by moving a mixture of a vapor and a gaseous fluid through a nozzle so that the mixture expands in the nozzle sufficiently to condense a substantial portion of the vapor and transform the latent heat of the condensation into kinetic energy of the gaseous fluid. The fluid jet energized by the latent heat of condensation of the vapor can be used in many ways, including a turbine drive, in either open- or closed-cycle systems. The same expansion, condensation, and transformation of the latent heat of condensation into kinetic energy of a gaseous working fluid can be used in a thermodynamic process for heat engines that convert the kinetic energy of the gaseous working fluid into shaftwork. The process can be applied to both open- and closed-cycle engines, and in effect, the energy added to vaporize the liquid is transformed into kinetic energy of the gaseous working fluid when the vapor condenses so that heat engines can be made to run solely on the latent heat of vaporization and condensation.

The expansion of the vapor and gaseous fluid mixture preferably occurs in a nozzle and can be sufficient to solidify the condensate of the vapor and transform the latent heat of fusion into kinetic energy. For closed-cycle latent heat engines, the vapor and gaseous fluid mixture is expanded in a nozzle, used to drive a turbine to perform shaftwork, and the turbine exhaust is recompressed to repeat the cycle. Liquid from condensation of the vapor is gathered from the region of the nozzle and the turbine, compressed, revaporized, and recombined with the compressed gaseous fluid. In effect, the gaseous working fluid is driven continuously through the nozzle and the turbine by the latent heat of condensation of the vapor, and this latent heat is continuously restored to the separated condensate. A convenient way of accomplishing this is with a vaporizing process operating at constant-temperature and pressure to combine a substantially saturated vapor with a gaseous fluid, preferably by bubbling the gaseous fluid through liquid in a boiler. The mixture of vapor and gaseous fluid from the boiler is directed through the nozzle and turbine, the condensate is collected and returned to the boiler, and a diffuser, compressor, or blower is used to force the turbine exhaust back into the boiler.

DRAWINGS

DETAILED DESCRIPTION

Generally

Figure 1:
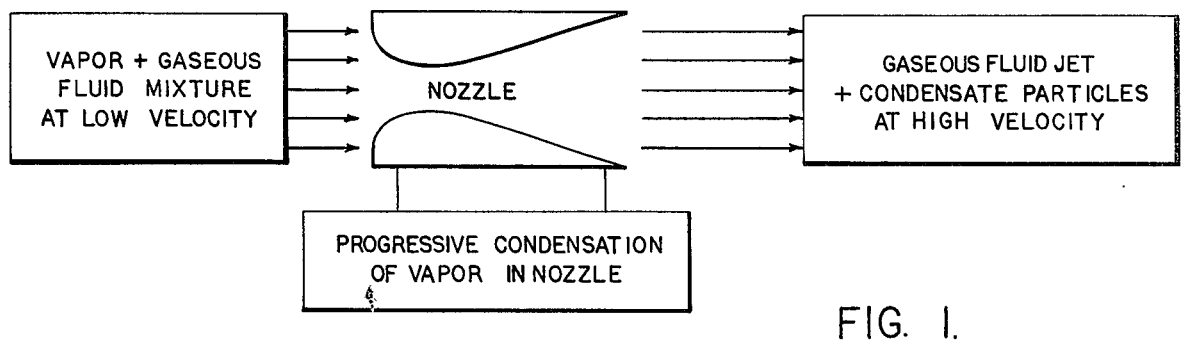
FIG. 1 is a schematic diagram of the transfer of the latent heat of condensation into kinetic energy in a nozzle according to the invention.

The invention generally involves use of the latent heat of condensation of a vapor to increase the kinetic energy of a gaseous working fluid to form a jet or drive a turbine. The invention imitates natural weather phenomena in which the latent heat of condensation and fusion of the relatively small proportion of water vapor in the air provides tremendous amounts of energy for storms. Volumes of air that expand enough to condense or solidify a substantial amount of water vapor receive energy from the heat of condensation or fusion and often convert this energy into kinetic energy in the form of high-velocity wind.

The invention recognizes ways that the latent heat of condensation of a vapor can be transformed into increased kinetic energy of a gaseous working fluid to form a high-velocity jet by expanding a mixture of the vapor and the gaseous working fluid in a nozzle. For use in a latent heat engine, energy is input to vaporize a liquid, and this energy is transformed into kinetic energy of the gaseous working fluid as the vapor condenses in a nozzle and turbine, which converts some of the kinetic energy to shaftwork.

By effectively using the latent heat of condensation of a vapor for imparting kinetic energy to a gaseous working fluid, the invention not only imitates nature, but achieves efficiencies previously regarded as impossible. No heat sink is required for latent heat engines operating according to the invention, and no heat is discarded, so that energy losses are primarily frictional and minor heat losses to the ambient atmosphere. A vapor provides an excellent energizing medium, because it can be efficiently condensed and revaporized to convey energy to a gaseous working fluid, which provides an efficient, elastic medium for driving a turbine. As shown by the earth's atmosphere, a small proportion of a vapor can effectively energize a relatively large proportion of a gaseous fluid. Temperatures and pressures for practicing the invention can be far lower than corresponding temperatures and pressures for steam engines to effect an enormous saving in turbines and other components that do not have to withstand high temperatures and pressures. Lower operating temperatures and pressures permit more efficient use of conventional heat sources and also allow use of heat or energy sources that are not practical for steam engines, and these include waste heat from other processes, such as waste industrial heat and heat discarded at the condensers of present steam engines, solar energy, geothermal energy, and combustable fuels other than those used to power present steam plants. The high efficiency of the invention also allows efficient energy storage in the form of a liquid under heat and pressure sufficient to produce vapor for a latent heat engine. Electric output can be used to heat a liquid supply for storing energy that can be efficiently reconverted to electricity. These and other advantages of the invention are explained more fully below.

For most purposes, the preferred gaseous working fluid is air, and the preferred vapor is water vapor, but many other gaseous working fluids and vapors can be used. Taking as an example a closed-cycle engine using air driven by the latent heat of water vapor, the air is driven continuously through a turbine by the substantial and readily available heat of condensation of the vapor, and the turbine extracts shaftwork. The condensate is easily collected from the nozzle and turbine and revaporized in any of a variety of ways to continuously transfer energy to the air as the vapor condenses in a nozzle. Part of the kinetic energy produced is used to recompress the air that is exhausted from the turbine, and kinetic energy of the exhaust air itself can be used for recompressing the air in a diffuser, or some of the shaftwork from the turbine can be used to drive a blower or compressor for recompressing the air exhausted from the turbine. The force sustaining the air flow in the engine is provided solely by the latent heat of condensation of the vapor that kinetically energizes the air as the vapor cools and condenses, and this energy is continuously restored to the vapor in a boiler. Latent heat engines according to the invention preferably operate with saturated, rather than super heated, vapor at advantageously low temperatures and pressures with relatively simple equipment.

Nozzle Operation

To understand the invention, it is important to understand the energy transfer that occurs in a nozzle as the invention is practiced, and this is schematically shown in FIG. 1. Nozzle design is a well-developed art, and it is generally known that a gaseous fluid enters a nozzle at a relatively low velocity, and is expanded and accelerated in the nozzle to emerge at a higher velocity. The initial temperature and pressure of the fluid are both reduced in the nozzle as the fluid expands so that the enthalpy of the fluid is effectively converted into increased kinetic energy.

In practicing the invention, nozzles are properly designed so that the expansion of a mixture of vapor and a gaseous working fluid in the nozzle is sufficient for condensing the vapor. Since the vapor is well mixed with the gaseous working fluid and occupies the same volume as the gaseous working fluid, the latent heat of condensation that is given off as energy as the vapor condenses is necessarily transferred to the surrounding gaseous working fluid. The condensation of the vapor does not necessarily occur instantaneously or in a particular region of the nozzle, and can occur progressively to condense more and more of the vapor as the mixture continuously expands in passing through the nozzle. The vapor is preferably saturated as the mixture enters the nozzle so that expansion of the mixture in the nozzle brings the temperature and pressure of both the vapor and the gaseous working fluid below the dew point of the vapor. As this occurs, the vapor progressively condenses and transfers its latent heat of condensation to the surrounding molecules of the gaseous working fluid to add to the enthalpy of the gaseous working fluid, and this continues as long as the mixture expands. The nozzle is preferably designed so that the energy transferred to the gaseous fluid upon condensation of the vapor is converted primarily into kinetic energy, since that is most useful in driving a turbine. Of course, a series of nozzles can be used, nozzles can be formed as part of a turbine, and fluid expansion can occur in several stages of nozzles and turbine blades.

Since the vapor is preferably a relatively small proportion of the total mixture, the condensate of the vapor can be input to the turbine blades without causing undue problems. Also, the condensate can be separated from the remaining gaseous working fluid in the region of the nozzle or the turbine, or both, and centrifugal or inertial separation of the condensate is preferred.

Nozzles may have to be redesigned for practicing the invention, but nozzle design is generally understood so that workers in the art can construct nozzles suitable for the parameters of a gaseous and vaporous working medium according to the invention. Turbines will probably also require redesign in well-understood ways for optimally converting to shaftwork a portion of the kinetic energy of a gaseous working fluid energized by the latent heat of condensation according to the invention. Turbines built to practice the invention will benefit metallurgically and otherwise from lower operating pressures and temperatures and are likely to be generally less expensive.

Nozzles can also be designed relative to other parameters to expand the working medium sufficiently to solidify the vapor or condensate and also transfer the latent heat of fusion to the gaseous working fluid. With a water and air mixture, this results in a small proportion of snow or ice mixed in with the gaseous working fluid, which then has a kinetic energy further increased by transfer of the heat of fusion.

Working Medium

For most purposes, air and water vapor are preferred for the working medium in practicing the invention. The water vapor is preferably saturated for input to the nozzle so that its latent heat of condensation is available as soon as the mixture expands in the nozzle, and expansion preferably continues until a substantial portion of the vapor condenses and transfers its latent energy to the air or other gaseous working fluid. The vapor is never entirely condensed, and the gaseous working fluid passing through the turbine and out into the turbine exhaust still contains saturated vapor, even though a substantial amount of vapor has been condensed. So "gaseous working fluid" as used in this application refers to a gaseous medium that always contains some vapor, and the vapor is saturated during expansion and super heated during compression. The higher temperature and pressure of the vapor and working fluid mixture as input to the nozzle allows the input mixture to contain substantially more vapor than remains in the gaseous working fluid that is exhausted from the turbine.

Many vapors other than water vapor can be used, and the gaseous working fluid can be any combination of available gases and vapors. The operating environment of the heat source to be used and other variables influence selection of the desired operating temperatures and pressures, which in turn influence the selection of vapors and gaseous working fluids, and the invention is preferably practiced at temperatures and pressures near the saturation line for the vapor that is used. If the latent heat of fusion is also to be used, this may affect the selection of the vapor phase. The gaseous working fluid can also be a condensable vapor that is condensed at lower temperatures and pressures than the driving vapor.

Moist ambient air can also be used in practicing the invention, and relatively warm and moist, wind-driven air is preferred. The latent heat of condensation of the moisture in the air can be converted to kinetic energy in a wind turbine according to the invention for extracting considerably more energy from ambient wind than is possible with any sort of windmill having movable elements on which the wind impinges. This is described more fully below.

Wind Turbine

Figure 2:
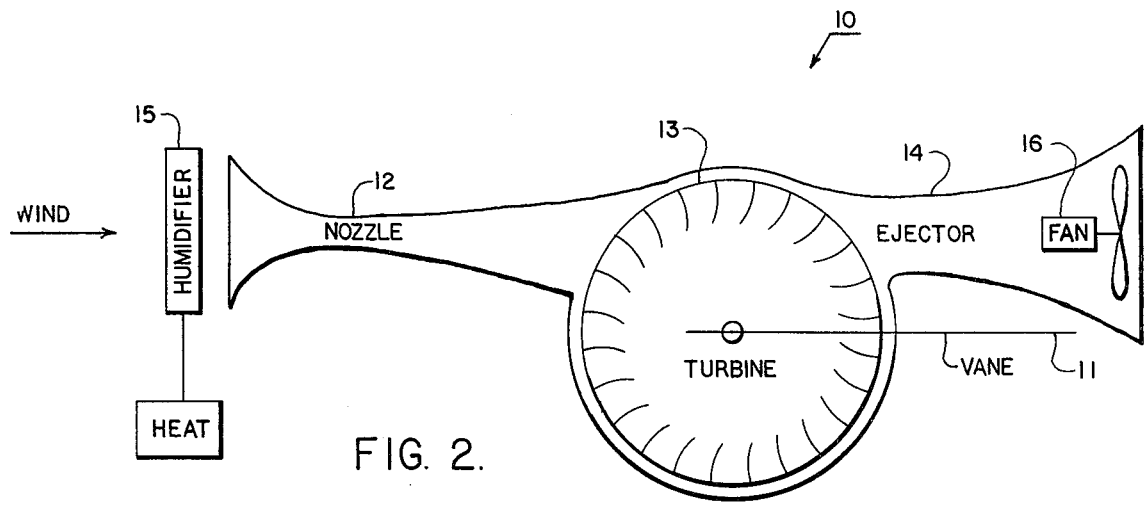
FIG. 2 is a schematic plan view of a wind turbine according to the invention.
Figure 3:
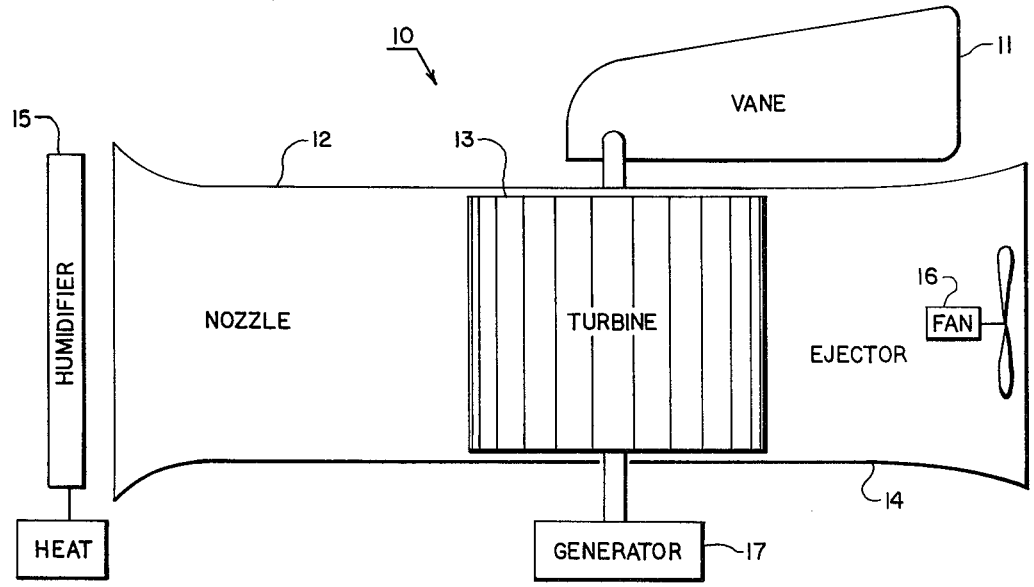
FIG. 3 is a schematic side elevational view of the wind turbine of FIG. 2.

A wind turbine 10, as shown schematically in FIGS. 2 and 3, affords a simple way of practicing the invention in a manner analogous to natural weather phenomena. Preferably warm, moist air in an ambient wind is used as an energy source, and a vane 11 directs a nozzle 12 into the ambient air, which is expanded and accelerated in nozzle 12 to increase its kinetic energy for driving turbine 13. The moist air is expanded sufficiently in nozzle 12 to condense a substantial portion of the vapor and transform the energy from the latent heat of condensation into increased kinetic energy of the air for powering turbine 13. An ejector 14 directs the exhaust from turbine 13 into the ambient wind at a velocity less than the ambient wind to help force air through turbine 13. The condensate can be removed and used for various purposes or discarded, and wind turbine 10 is in effect an open-cycle heat engine.

In addition to the fundamentals described above, a heated humidifier 15 can be arranged ahead of nozzle 12 for insuring that the water vapor in the incoming air is saturated, a fan 16 can be added for pulling ambient air through nozzle 12 and turbine 13 to assist engine 10 if the wind velocity is inadequate, and a generator 17 is used to convert shaftwork from turbine 13 into useful electricity. Nozzle 12 swings freely about a vertical axis to orient automatically into wind from any direction, and nozzle 12 is preferably counterbalanced to pivot around the vertical axis of turbine 13. Also, a pair of turbines 13 can be mounted on the same vertical axis and a pair of nozzles 12 disposed on opposite sides of the turbine axis can be pivotally mounted for driving respective upper and lower stages of the turbine.

By using the energy from the latent heat of condensation of moisture in the air, wind turbine 10 extracts much more energy from the wind than is possible with a prior art windmill. The conversion of the latent heat of condensation into kinetic energy of the air in the nozzle directs air against the blades of turbine 13 at a much higher velocity than the velocity of the ambient wind.

Many variations and sophistications can be added to the basic concept of a wind turbine as shown in the drawings.

Closed Thermodynamic Cycle

Figure 4:
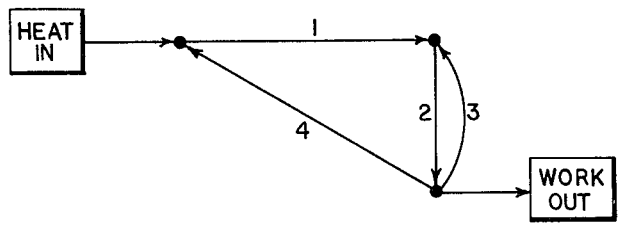
FIG. 4 is a thermodynamic cycle diagram of the inventive process as applied to a closed-cycle latent heat engine.
Figure 5:
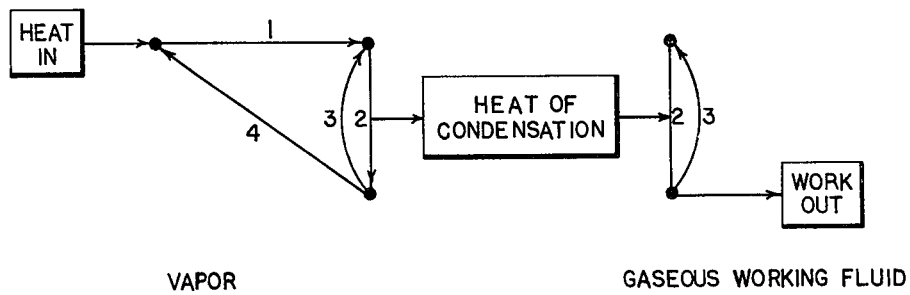
FIG. 5 is a thermodynamic diagram separately showing the gaseous working fluid portion and the vapor portion of the diagram of FIG. 4.

Closed-cycle heat engines have been most successful in the past, and the invention will probably be applied to future closed-cycle systems, as shown in FIGS. 4 and 5. The inventive cycles for the vapor and gaseous working fluid are shown together in FIG. 4, and separated in FIG. 5.

Heat is added to a liquid at step 1 to vaporize the liquid by adding the latent heat of vaporization, and this is preferably done in a boiler operating at a constant temperature and pressure as generally known to produce a preferably saturated vapor. The gaseous working fluid is combined with the vapor, preferably in a boiler, and the mixture at the upper right point of the diagram is at a suitable temperature and pressure for beginning the working leg of the cycle.

The mixture of vapor and gaseous working fluid is expanded in step 2 where the decreasing temperature releases the vapor's latent heat of condensation and transfers it to the gaseous working fluid as shown in FIG. 5. The energy transfer from the condensing vapor to the gaseous working fluid is progressive as expansion and cooling of the mixture lowers the vapor temperature below the dew point. The energy given off by the vapor as it condenses is converted to kinetic energy of the gaseous working fluid in nozzles, and at the end of the second step, shaftwork is output, preferably from a turbine.

Instead of discarding unavailable heat to a sink via exhaust or a condenser as is required for steam engines, the gaseous working fluid is compressed adiabatically in step 3 back up to boiler pressure and temperature without discarding any heat. A diffuser, compressor, or blower can be used for compressing the exhaust fluid from the turbine, and the preferred method is to direct the compressed working fluid back into a boiler for recombining it with vapor.

Liquid condensate from the vapor is compressed sufficiently to be pumped back into the boiler in step 4 where the latent heat of vaporization is added to revaporize the liquid and continue the cycle. In practice, condensate is preferably collected from the region of the nozzle and the turbine in the most convenient way and pumped back into the boiler by a pump requiring relatively little energy. Liquid is transferred in step 4, and some vapor is transferred in step 3 of the diagram of FIG. 5, because all of the vapor in the gaseous working fluid is never condensed, and some is always returned as vapor with the compressed gaseous fluid in addition to the liquid returned for reheating in step 4.

The recompression of the gaseous working fluid in step 3 can be accomplished by a diffuser using the kinetic energy of the gaseous working fluid that remains upon exhaust from the turbine. If the turbine is designed to convert a suitable proportion of the kinetic energy of the gaseous working fluid into shaftwork sufficient kinetic energy can remain in the exhaust so that a diffuser can recompress the turbine exhaust to the upper pressure and temperature line of step 1. Shaft-driven compressors or blowers can also be used for recompressing the turbine exhaust in step 3, if desired. As explained below, the invention can be practiced efficiently with a relatively small pressure drop from the beginning to the end of step 2 so that relatively little recompression is required in step 3. Because of efficient use of the latent heat of condensation, substantial energy is extracted as shaftwork in addition to the energy required for recompressing the turbine exhaust.

The gaseous working fluid cycles continuously through the adiabatic expansion of step 2 and the adiabatic compression of step 3. It receives the latent heat of condensation from the vapor in step 2 and converts this into kinetic energy that is partially removed as shaftwork at the end of step 2. A portion of the latent heat energy is used to recompress the gaseous working fluid in step 3.

The vapor cycles through 4 steps. The vaporization of step 1 adds latent heat that is transferred to the gaseous working fluid as the vapor cools and condenses in step 2. Compressed condensate returns as liquid in step 4, and uncondensed vapor is recompressed and super heated and returned with the recompressed gaseous working fluid in step 3.

Since no heat has to be discarded to a sink in practicing the invention, the inventive cycle is far more efficient than previous heat engine cycles. The only losses are heat losses to the ambient atmosphere, directly or through friction, and since operating temperatures and pressures are preferably much lower than for steam engines, heat losses can be kept very small.

Closed-cycle Latent Heat Engines

Figure 6:
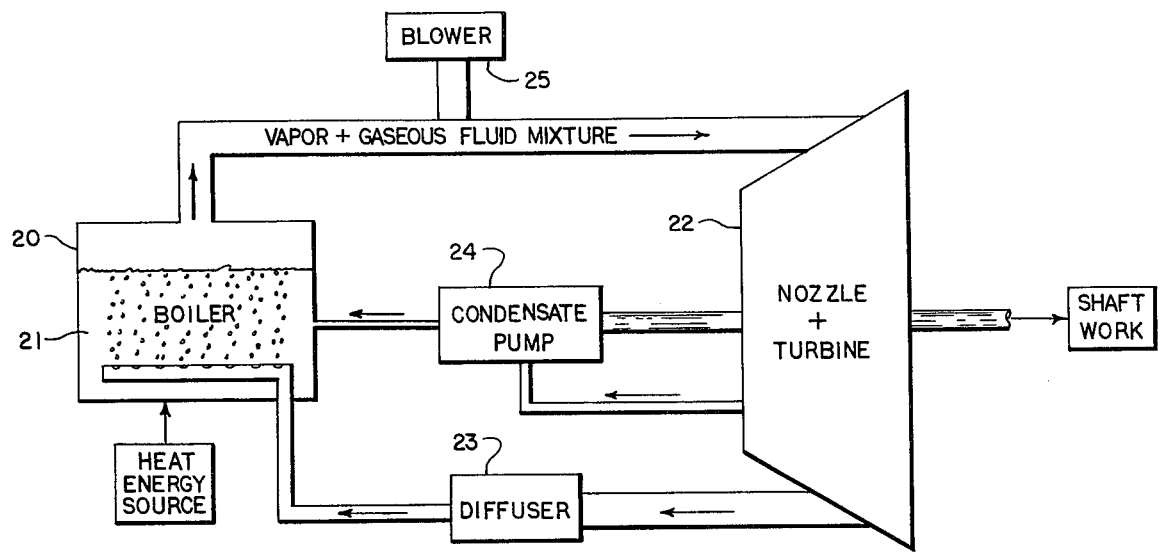
FIGS. 6–8 are schematic diagrams of preferred embodiments of closed-cycle latent heat engines according to the invention.
Figure 7:
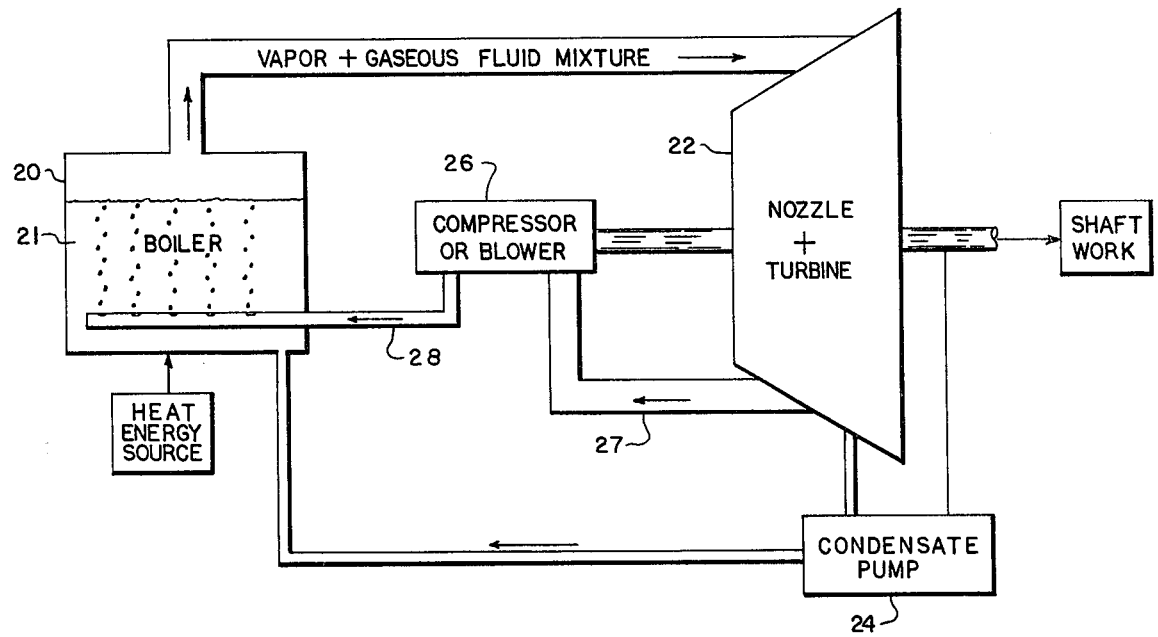
Figure 8:
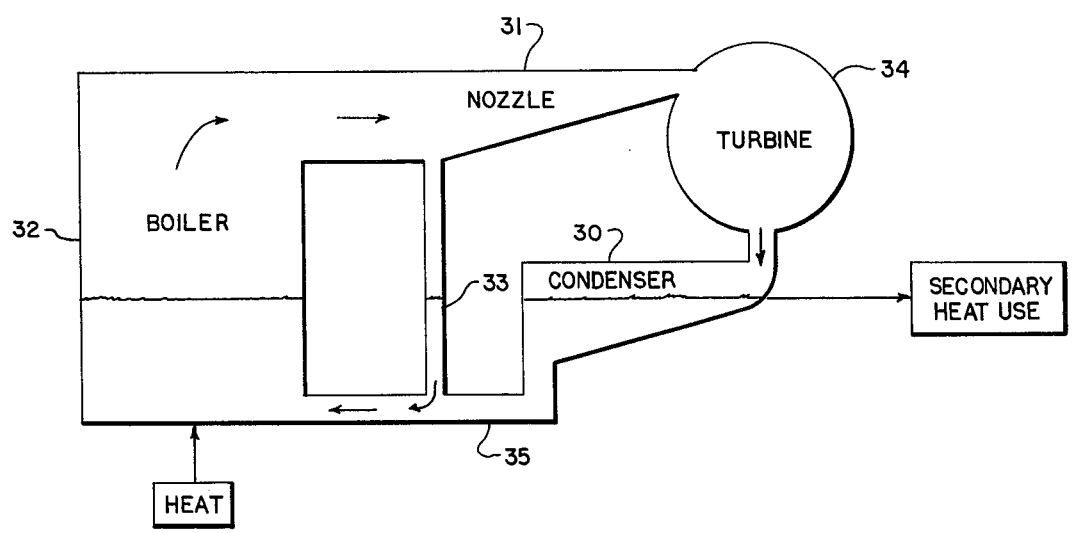

The thermodynamic cycle explained above relative to FIGS. 4 and 5 is practiced in the schematically illustrated latent heat engines of FIGS. 6–8. Heat applied in boiler 20 of the engine of FIG. 6 adds the latent heat of vaporization to liquid 21, and the resulting saturated vapor is mixed with a gaseous working fluid and delivered to nozzle and turbine 22 where the mixture is expanded, the energy from condensation heat is transferred to kinetic energy, and shaftwork is extracted. The turbine exhaust gases have sufficient kinetic energy to be compressed by diffuser 23 and forced into boiler 20 where they are preferably bubbled through liquid 21 to be remixed with saturated vapor. Some of the shaftwork is used to drive condensate pump 24 so that liquid from condensation of the vapor is gathered and pumped back into boiler 20. Blower 25 is arranged in one of several possible locations for establishing a flow of the gaseous working fluid through the engine for starting it up, and then blower 25 is turned off as unnecessary.

The engine of FIG. 7 is similar to the engine of FIG. 6, except that a compressor or blower 26 is used instead of a diffuser for recompressing the turbine exhaust from line 27 and delivering the compressed working fluid through line 28 into boiler 20 where it is bubbled through liquid 21 to be recombined with vapor. A small portion of the shaftwork from turbine 22 is preferably used for driving compressor or blower 26, and an even smaller portion of the turbine shaftwork is used for driving condensate pump 24. The gaseous working fluid exhausted from turbine 22 in the engine of FIG. 7 does not need to retain kinetic energy for its own recompression, and turbine 22 is preferably designed to convert substantially all of the kinetic energy of the gaseous working fluid into shaftwork. Compressor or blower 26 preferably also has access to a source of power so that it can establish the initial flow of the gaseous working fluid for starting up the engine.

The engine of FIG. 8 combines the inventive cycle with a prior art type of thermodynamic cycle by using a condensable vapor as the gaseous working fluid. Both the vaporous working fluid and the driving vapor are saturated and progressively condensed, but the driving vapor preferably contains more enthalpy than the working vapor to transfer substantial latent heat to the working vapor as the mixture expands in the nozzle. The usual condenser 30 removes the remaining heat of condensation from the vaporous working fluid and the driving vapor and preferably transfers it to a secondary heat use. The latent heat from the condensation of the driving vapor kinetically energizes the gaseous working fluid passing through turbine 34, which converts the kinetic energy into shaftwork. Condensate from nozzle 31 returns to boiler 32 via condensate return line 33, and condensate from condenser 30 also returns to boiler 32 via condensate return line 35. Energy added in boiler 32 revaporizes both liquids to sustain the cycle.

The invention can also be applied to open-cycle engines simply by discarding or making other use of the turbine exhaust. Furthermore, the condensate is distilled water when water vapor is used as the energy-transferring medium, so that the inventive engine can be used for producing both power and usable pure water as described more fully below.

Liquid Energy Storage

Figure 9:
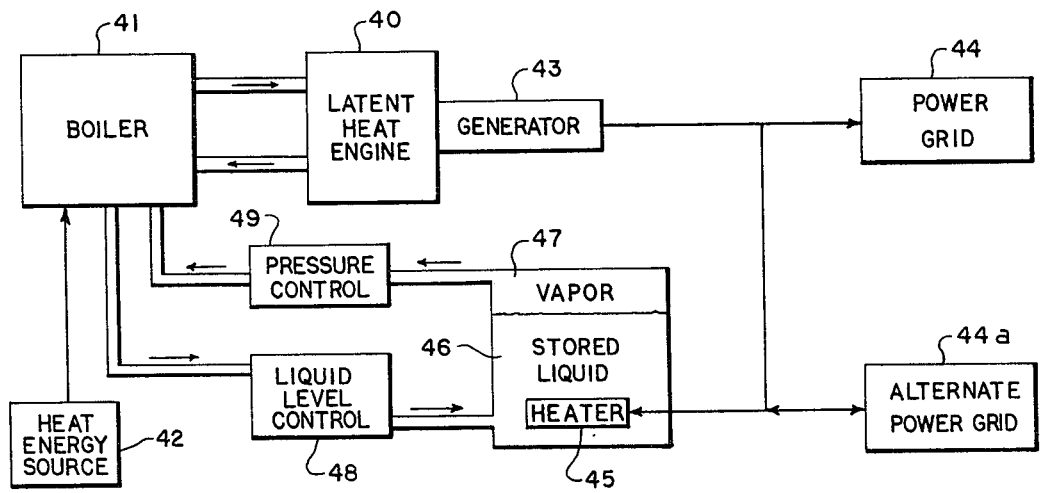
FIG. 9 is a schematic diagram of the inventive latent heat engine as applied to both power production and energy storage.

Since a latent heat engine according to the invention does not require discarding of energy to a sink, it can be made to operate at efficiencies closely approaching 100%, and this allows it to work in cooperation with energy-storage systems that were not practical with prior art heat engines. An example of one preferred way of accomplishing this is shown schematically in FIG. 9. Latent heat engine 40 is powered by boiler 41 and heat energy source 42 as generally described above to drive generator 43 to produce electricity for a power network grid 44. When power requirements for grid 44 are low enough, excess electricity is directed to heater 45 to heat a stored quantity of liquid 46. The temperature and pressure of liquid 46 can be raised sufficiently to store a large amount of energy to be used later as required, and the temperature and pressure of stored liquid 46 is preferably substantially above the operating temperature and pressure of boiler 41. As the vapor 47 in the small space above liquid 46 is allowed access to boiler 41 by pressure controller 49, it flows into boiler 41 and helps heat the liquid in boiler 41 and provide vapor for operating engine 40. Liquid level control 48 includes a pump for occasionally pumping liquid from boiler 41 back to liquid storage 46 to maintain the proper liquid level in boiler 41, and very little energy is required for this. Energy from stored liquid 46 can assist energy source 42 during peak power demands, or can be used as the sole source of energy for engine 40 for a substantial period. Alternate power grid 44a can receive power from generator 43 and deliver electricity from another source to heater 45 for storage in liquid 46.

Electrical energy has been difficult to store in large quantities, and hot liquid energy storage has been impractical for prior art heat engines, because so much of the stored energy would be discarded and wasted in reconverting the energy to work. The substantially improved efficiency of the inventive latent heat engine makes liquid energy storage feasible and allows relatively efficient conversion of energy back and forth between electricity and a liquid heat source. This can have far-reaching effects on power-producing and distribution systems.

Water Production

Figure 10:
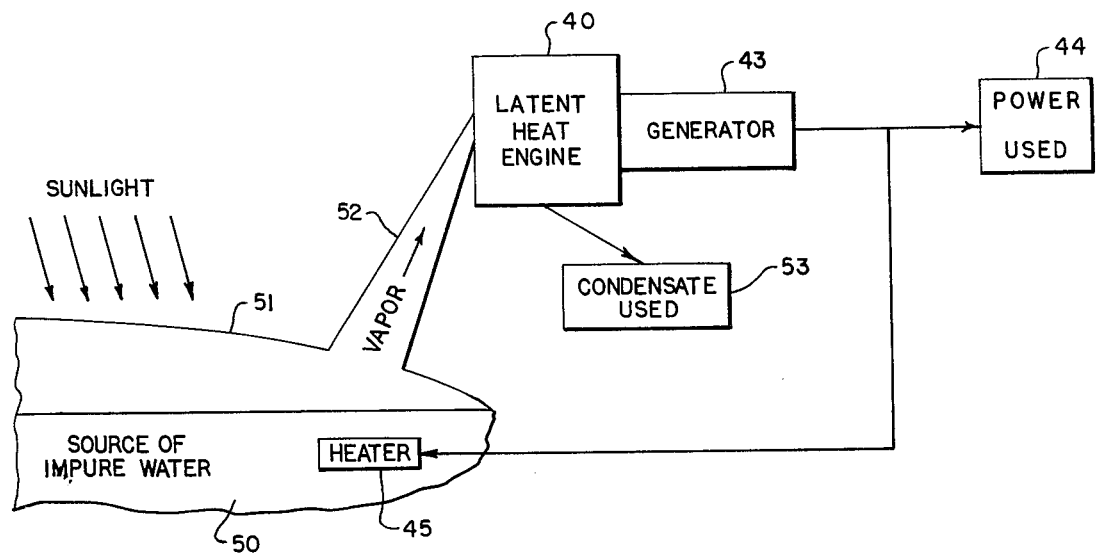
FIG. 10 is a schematic diagram of the inventive latent heat engine as applied to both power and pure water production and also energy storage.

The efficient conversion of the energy from heated liquid into electricity by the inventive latent heat engine can be used to produce pure water, as well as power, as shown in the example of FIG. 10. A pond, reservoir, or source 50 of impure water such as salt water or polluted water can be heated to give off vapor that is used for driving latent heat engine 40 as generally described above. One way to do this is to cover source 50 with a cover 51 that allows sunlight to heat the water and allows ambient air to move in under the cover at appropriate places so that air saturated with water vapor moves to a preferably upwardly inclined passageway 52 having a chimney effect conveying the vaporized air to heat engine 40. Engine 40 drives generator 43 to produce usable power 44, and a portion of the generated electricity can be directed back to a heater 45 that is preferably disposed under the vapor outlet 52 within source 50 for increasing the vapor output if necessary and for storing energy in source 50 as desired. Assuming plenty of water is available in source 50, engine 40 is operated as an open-cycle engine directing its turbine exhaust into ambient atmosphere, and the condensed vapor from engine 40 is gathered in a collector 53 from which it can be put to any of a wide variety of valuable uses, including drinking water.

Operating Parameters

A complete set of operating parameters for latent heat engines optimally practicing the invention have not been developed yet, and judgments or requirements for various components of the engine influence the parameters so that full development is premature until some of the basics have been decided. All of this is within the skill of workers in the heat engine arts, however, and the same formulas, relationships, and calculations that are well known for steam engines can be applied in designing efficient latent heat engines according to the invention.

Generally, maximum temperatures and pressures are preferably far lower than for steam engines, and this alone results in many design changes. For example, turbines and turbine blade design as well enough understood so that efficient turbines can be designed for operating with air or some other gaseous working fluid that preferably enters the turbine at high velocity. The operating rpm and blade design for the turbines may differ from steam turbines in practicing the invention, but all the basic principles and relationships remain the same. Turbines can be impulse, reaction, or combinations of impulse and reaction and can be made in a variety of sizes with different numbers of stages, all as generally understood. Nozzle design is also well understood in the art and can be applied to suitable operating parameters for the invention to produce high output velocity for optimum efficiency.

Considerable calculation has been done in applying the invention to hypothetical latent heat engines, however, to establish the practicability of the general principles involved. These calculations have considered representative temperatures and pressures and enthalpies of air and water vapor as preferred ingredients in a working medium. They have also shown the increases and decreases in enthalpy as energy is transferred from the water vapor to the air and as the pressure, temperature, and velocity of the working medium changes at different points in the inventive cycle. The calculations generally show that every step of the inventive process is practical and workable, that substantial energy is transferred and substantial power and shaftwork is output. Calculations based on adiabatic cycles not accounting for incidental heat losses also show efficiencies closely approaching 100%.

To show the workability of the underlying principles involved in the invention, thermodynamic calculations were applied to a simple latent heat engine having a single-stage impulse turbine and a nozzle achieving sonic velocity at the nozzle throat. Some operating conditions were assumed for calculation purposes, and these include saturated water vapor from a constant-temperature-and-pressure boiler operating at 130° F to produce a flow rate through the engine of one pound of air per second driven by the latent heat of condensation of water vapor. The engine operates on a closed cycle as shown in FIGS. 4 and 5 and has the form schematically illustrated in FIG. 6 using a diffuser to recompress the turbine exhaust gases for return to the boiler. Tables and relationships from standard reference books were used in calculating parameters to determine operability.

Assuming an initial charge of dry air at 50° F at a pressure of 14.7 psi, the volume of a pound of such air is 12.84 cu.ft., using standard calculations. After the boiler raises the temperature of the air to 130° F and saturates the air with water vapor, the air pressure is 17.006 psi and the water vapor pressure is 2.223 psi for a total pressure of 19.229 psi delivered to the nozzle. The enthalpy of the mixture input to the nozzle at 130° F is 23.618 btu/#air for the air and 91.228 btu/#air for the water vapor mixed in with the air for a total enthalpy of 114.846 btu/#air. This gives a specific humidity at 130° F of 0.08160671/#air. The mixture is assumed to have zero velocity in the boiler so that the total energy/#air is equal to the total enthalpy of 114.846 btu/#air.

The expansion of the mixture in the nozzle is considered as an adiabatic expansion of the air, since the air mass of the mixture is very large in proportion to the vapor mass. Also, the nozzle is designed to achieve sonic velocity of the mixture at the nozzle throat, and this is estimated using two generally known relationships. One relationship is:

$$sv = \sqrt{gKRT_c}$$

with "g" being the gravitational constant, $K = 1.4$, and $R = 53.3$, so that the sonic velocity varies with the temperature "$T_c$" at the nozzle throat. The other relationship:

$$v = 223.8\sqrt{h_b - h_c}$$

relates nozzle velocity to change in enthalpy of the mixture. Assumed temperatures at the nozzle throat were then calculated until the velocities for each relationship agreed. This resulted in $T_c$ at the nozzle throat being 114.85° F producing sonic velocity of about 1175 fps, which agrees closely with the velocity calculated from the change in enthalpy from 130° F to 114.85° F.

At 1175 fps velocity at the nozzle throat at a temperature of 114.85° F, the air has an enthalpy of 19.967 btu/#air and the uncondensed vapor has an enthalpy of 65.418 btu/#air, a portion of the higher input enthalpy of the vapor having been converted to kinetic energy of the air as vapor condensed in the nozzle. The condensed water entrained in the high-velocity mixture has an enthalpy of 1.883/#air so that 27.578 btu/#air is converted to kinetic energy by the time the mixture reaches the throat of the nozzle.

The single-stage impulse turbine of the engine converts one-half of the kinetic energy of the jet into shaftwork, and this leaves the enthalpy figures unchanged and reduces the velocity to 831 fps. The diffuser recompressing the turbine exhaust to 20 psi for return to the boiler adiabatically increases the temperature of the mixture to 158° F and converts the remaining kinetic energy back into enthalpy so that the mixture that is recompressed and returned to the boiler has an air enthalpy of 30.366 btu/#air and a vapor enthalpy of 66.470 btu/#air for a total of 96.836 btu/#air. Heat added in the boiler vaporizes liquid to replace the enthalpy of 13.789 btu/#air, and this corresponds to the energy removed by the turbine as shaftwork to produce about 19.5 hp at 100% efficiency. A small portion of this shaftwork is used to pump the condensate back into the boiler. The results of the calculations are summarized in the following table, where the numbered columns refer to the steps in the thermodynamic cycle diagrams of FIGS. 4 and 5, with column 1C showing conditions at the nozzle throat.

| BLOCK DIAGRAM LOCATION | 1 | 1C | 2 | 3 | 1 |
|---|---|---|---|---|---|
| Temperature °F | 130 | 114.85 | 114.85 | 158 | 130 |
| °R | 590 | 574.85 | 574.85 | 618 | 590 |
| Pressure - psi | | | | | |
| Air | 17.006 | 15.526 | 15.526 | 20.000 | 17.006 |
| Vapor | 2.223 | 1.465 | 1.465 | 1.879 | 2.223 |
| Total | 19.229 | 16.991 | 16.991 | 21.879 | 19.229 |
| Air Vol. - ft³ | 12.84 | 13.704 | 13.704 | 11.437 | 12.84 |
| Water Vapor - #/#air | .0816 | .0588 | .0588 | .0588 | .0816 |
| Enthalpy - btu/#air | | | | | |
| $h_a$ | 23.618 | 19.967 | 19.967 | 30.366 | 23.618 |
| $h_v$ | 91.228 | 65.418 | 65.418 | 66.470 | 91.228 |
| $h_t$ | 114.846 | 85.385 | 85.385 | 96.836 | 114.846 |
| Velocity - ft/sec | 0 | 1175 | 831 | 342 | 0 |
| Energy Summary - btu/#air | | | | | |
| $h_t$ | 114.846 | 85.385 | 85.385 | 96.836 | 114.846 |
| K.E. | 0 | 27.578 | 13.789 | 2.338 | 0 |
| Total | 114.846 | 112.963 | 99.174 | 99.174 | 114.846 |
| Shaftwork - btu/#air | 0 | 0 | 13.789 | 0 | 0 |
| Heat Added - btu/#air | 13.789 | 0 | 0 | 0 | 13.789 |
| Enthalpy Condensed Water | 0 | 1.883 | 0 | 0 | 0 |

Similar calculations apply the invention to a wind turbine as schematically shown in FIGS. 2 and 3, assuming a 30 mph wind at a temperature of 95° F, with a relative humidity of 95% and a standard barometric pressure of 14.696"hg. At these conditions, the enthalpy of the air is 15.183 btu/#air, the enthalpy of the vapor is 38.25 btu/#air, and the total enthalpy of the mixture is 53.43 btu/#air. The kinetic energy from the input velocity of the mixture also produces 0.04 btu/#air so that the total energy of the incoming air is 53.47 btu/#air.

Similar calculations to establish the temperature and sonic velocity of the mixture at the nozzle throat show a temperature of 67.75° F and a sonic velocity of 1125.5'/sec. This results in a transfer into kinetic energy of 16.3 btu/#air from the enthalpy of the incoming mixture, mostly from the latent heat of condensation of the vapor. From this, kinetic energy for 1#/air/sec, a single-stage impulse turbine extracts approximately 23 hp.

Such calculations are within the skill of workers familiar with similar calculations relative to steam and other heat engines, and many variations can be made in the basic calculational format in applying the invention to various heat engines. The calculations generally show that relatively low operating pressures and temperatures are both workable and desirable. Once the substantially increased efficiencies from practice of the invention are appreciated, workers experienced with heat engines will readily understand the many variations available in practicing the invention.

I claim:

1. A method of forming a jet of a gaseous fluid for driving a turbine in a heat engine, said method comprising moving a mixture of a vapor and said gaseous fluid through a nozzle so that the expansion of said mixture in said nozzle is sufficient to transform the latent heat of condensation of a substantial portion of said vapor into kinetic energy of said gaseous fluid and cause a substantial portion of said vapor to condense, separating said condensed vapor from said gaseous fluid, and compressing and returning the exhaust from said turbine for reentry to said nozzle.

2. A method of forming a jet of a gaseous fluid for driving a turbine in a heat engine, said method comprising moving a mixture of a vapor and said gaseous fluid through a nozzle so that the expansion of said mixture in said nozzle is sufficient to transform the latent heat of condensation of a substantial portion of said vapor into kinetic energy of said gaseous fluid and cause a substantial portion of said vapor to condense, and returning and revaporizing the condensate of said vapor from the region of said nozzle and said turbine for reentry of said vapor to said nozzle.

3. The method of claim 2 including separating said condensed vapor from said gaseous fluid, compressing and returning the exhaust from said turbine for reentry to said nozzle.

4. The method of claim 3 wherein said gaseous fluid comprises another vapor and including condensing and compressing said other vapor from said turbine exhaust and returning and revaporizing the condensate of said other vapor for reentry to said nozzle.

5. A method of forming a jet of a gaseous fluid for driving a turbine in a heat engine, said method comprising moving a mixture of a vapor and said gaseous fluid through a nozzle so that the expansion of said mixture in said nozzle is sufficient to transform the latent heat of condensation of a substantial portion of said vapor into kinetic energy of said gaseous fluid and cause a substantial portion of said vapor to condense; using moist ambient air as said mixture; and directing said nozzle into ambient wind for moving said mixture through said nozzle.

6. The method of claim 5 including using an ejector for outputting the exhaust from said turbine back into said ambient wind.

7. The method of claim 5 including humidifying said ambient wind input to said nozzle.

8. The method of claim 5 including using power-driven means for drawing said ambient wind through said nozzle and said turbine.

9. A method of forming a jet of a gaseous fluid for driving a turbine in a heat engine, said method comprising moving a mixture of a vapor and said gaseous fluid through a nozzle so that the expansion of said mixture in said nozzle is sufficient to transform the latent heat of condensation of a substantial portion of said vapor into kinetic energy of said gaseous fluid and cause a substantial portion of said vapor to condense; and including using electrical energy to heat a stored supply of liquid to a sufficient temperature and pressure to serve as an energy source in forming said vapor.

10. A thermodynamic process for heat engines that convert the kinetic energy of a gaseous working fluid into shaftwork, said process comprising:
   a. vaporizing a liquid and combining the resulting vapor with said gaseous working fluid;
   b. expanding the mixture of said vapor and said gaseous working fluid sufficiently to transform the latent heat of condensation of a substantial portion of said vapor into kinetic energy of said gaseous working fluid and cause a substantial portion of said vapor to condense;
   c. separating said condensed vapor from said gaseous working fluid; and
   d. compressing said gaseous working fluid after step b. to repeat step a. without discarding heat.

11. The process of claim 10 including compressing said liquid from said condensation of said vapor after step b. for repeating step a.

12. A thermodynamic process for heat engines that convert the kinetic energy of a gaseous working fluid into shaftwork, said process comprising:
   a. vaporizing a liquid and combining the resulting vapor with said gaseous working fluid;
   b. expanding the mixture of said vapor and said gaseous working fluid sufficiently to transform the latent heat of condensation of a substantial portion of said vapor into kinetic energy of said gaseous working fluid and cause a substantial portion of said vapor to condense; and
   c. using electrical energy to heat a stored supply of liquid to a sufficient temperature and pressure to serve as an energy source in forming said vapor.

13. A heat engine having a nozzle and a turbine, and comprising:
   a. means for moving a mixture of a vapor and a gaseous working fluid through said nozzle;
   b. said nozzle being arranged for expanding said mixture sufficiently within said nozzle to transform the latent heat of condensation of a substantial portion of said vapor into kinetic energy of said gaseous working fluid and cause a substantial portion of said vapor to condense;
   c. said turbine being arranged for converting a portion of said kinetic energy into shaftwork; and
   d. means for direction said nozzle into ambient wind to receive moist air as said mixture.

14. The engine of claim 13 including means for humidifying said ambient wind input to said nozzle.

15. The engine of claim 13 including an ejector arranged for outputting the exhaust from said turbine back into said ambient wind.

16. The engine of claim 13 including power-driven means for drawing said ambient wind throuh said nozzle and said turbine.

17. A heat engine having a nozzle and a turbine, and comprising:
   a. means for moving a mixture of a vapor and a gaseous working fluid through said nozzle;
   b. said nozzle being arranged for expanding said mixture sufficiently within said nozzle to transform the latent heat of condensation of a substantial portion of said vapor into kinetic energy of said gaseous working fluid and cause a substantial portion of said vapor to condense;
   c. said turbine being arranged for converting a portion of said kinetic energy into shaftwork; and
   d. means for using electrical energy to heat a stored supply of liquid to a sufficient temperature and pressure for forming said vapor.

18. A heat engine having a nozzle and a turbine, and comprising:
   a. a boiler arranged for vaporizing a liquid to form a mixture of a vapor and a gaseous working fluid and to move said mixture through said nozzle;
   b. said nozzle being arranged for expanding said mixture sufficiently within said nozzle to transform the latent heat of condensation of a substantial portion of said vapor into kinetic energy of said gaseous working fluid and cause a substantial portion of said vapor to condense;
   c. said turbine being arranged for converting a portion of said kinetic energy into shaftwork;
   d. means for separating said condensed vapor from said gaseous working fluid; and
   e. means for compressing said gaseous working fluid that is exhausted from said turbine and using said compressed fluid for reforming said mixture.

19. The engine of claim 18 including means for directing said compressed fluid into said boiler to mix with said vapor.

20. The engine of claim 18 wherein said compressing means is a diffuser and including a blower arranged for starting up said heat engine.

21. A heat engine having a nozzle and a turbine, and comprising:
   a. a boiler arranged for vaporizing a liquid to form a mixture of a vapor and a gaseous working fluid and to move said mixture through said nozzle;
   b. said nozzle being arranged for expanding said mixture sufficiently within said nozzle to transform the latent heat of condensation of a substantial portion of said vapor into kinetic energy of said gaseous working fluid and cause a substantial portion of said vapor to condense;
   c. said turbine being arranged for converting a portion of said kinetic energy into shaftwork; and
   d. means for collecting said liquid as condensate of said vapor from the region of said nozzle and said turbine and for returning said liquid to said boiler.

22. The engine of claim 21 including means for compressing said gaseous working fluid that is exhausted from said turbine and using said compressed fluid for reforming said mixture.

23. The engine of claim 22 including means for directing said compressed fluid into said boiler to mix with said vapor.

24. The engine of claim 23 including means for generating electricity from said shaftwork, means for using a portion of said electricity to heat a supply of said liquid, and means for forming said vapor from said heated liquid.

25. A heat engine having a nozzle and a turbine, and comprising:
   a. means for moving a mixture of a vapor and a gaseous working fluid through said nozzle;
   b. said nozzle being arranged for expanding said mixture sufficiently within said nozzle to transform the latent heat of condensation of a substantial portion of said vapor into kinetic energy of said gaseous working fluid and cause a substantial portion of said vapor to condense;
   c. said turbine being arranged for converting a portion of said kinetic energy into shaftwork; and
   d. means for generating electricity from shaftwork, means for using a portion of said electricity to heat a supply of liquid, and means for forming said vapor from said heated liquid.

26. The engine of claim 25 wherein said vapor is water vapor, said gaseous working fluid is air, and said supply of liquid is impure water, and including means for collecting and using the water formed by the condensing of said vapor in the region of said nozzle and said turbine.

27. The engine of claim 21 wherein said gaseous working fluid comprises another vapor and including means for condensing said other vapor after exhaust from said turbine and returning liquid condensate from said other vapor to said boiler.

* * * * *